(12) United States Patent
Taylor et al.

(10) Patent No.: US 8,243,914 B2
(45) Date of Patent: *Aug. 14, 2012

(54) METHOD AND SYSTEM FOR USER PRIORITIZATION WITHIN CALL COMPLETION SERVICES USING A PREFERRED ALLOCATION OF RESOURCES

(75) Inventors: James A. Taylor, Fullerton, CA (US); Oren Tal, Tel-Aviv (IL); Reuven Tal, Tel-Aviv (IL)

(73) Assignee: On-Q Telecom Systems Co., Inc., Cheyenne, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/095,625

(22) Filed: Apr. 27, 2011

(65) Prior Publication Data
US 2011/0212728 A1 Sep. 1, 2011

Related U.S. Application Data

(63) Continuation of application No. 11/563,389, filed on Nov. 27, 2006, now Pat. No. 7,957,521.

(60) Provisional application No. 60/740,552, filed on Nov. 30, 2005.

(51) Int. Cl.
*H04M 3/00* (2006.01)

(52) U.S. Cl. ............ 379/266.01; 455/414.1; 379/142.06

(58) Field of Classification Search ............. 379/266.01, 379/266.02, 309, 142.01, 142.06; 455/414.1
See application file for complete search history.

(56) References Cited

U.S. PATENT DOCUMENTS

| | | | |
|---|---|---|---|
| 3,900,061 A | 8/1975 | Curtiss, Jr. | |
| 5,200,241 A | 4/1993 | Nied et al. | |
| 5,200,689 A | 4/1993 | Interiano et al. | |
| 5,300,135 A | 4/1994 | Hudson et al. | |
| 5,304,141 A | 4/1994 | Johnson et al. | |
| 5,400,066 A | 3/1995 | Matsumoto et al. | |
| 5,500,048 A | 3/1996 | Murch et al. | |
| 5,600,109 A | 2/1997 | Mizutani et al. | |
| 5,684,872 A | 11/1997 | Flockhart et al. | |
| 5,700,941 A | 12/1997 | Kulagowski | |
| 5,801,556 A | 9/1998 | LeFevre | |

(Continued)

FOREIGN PATENT DOCUMENTS

EP 2107817 10/2009

(Continued)

OTHER PUBLICATIONS

Repeat Dialing—wysiwyg://9/http://www.bellatlanti..home/NY/Products/RDX-01, 2 pages.

(Continued)

*Primary Examiner* — Olisa Anwah
(74) *Attorney, Agent, or Firm* — Leason Ellis LLP

(57) ABSTRACT

A method and system for hierarchical prioritization and execution of call completion services are provided. When a caller applies for a call completion service, the caller is identified and assigned a priority from among different priorities such as high priority or regular priority. Thereafter, attempts to execute call completion services are performed hierarchically by launching call completion services for callers having a higher priority before similar attempts are performed for callers of a lower priority. Hence, call completion services are handled according to the priority assigned to the callers rather than the order in which each caller applied for a call completion service.

20 Claims, 5 Drawing Sheets

U.S. PATENT DOCUMENTS

| | | | |
|---|---|---|---|
| 5,900,433 | A | 5/1999 | Igo et al. |
| 5,900,563 | A | 5/1999 | Leonard |
| 5,900,638 | A | 5/1999 | Jaeger et al. |
| 5,900,958 | A | 5/1999 | Nakamura et al. |
| 5,946,388 | A | 8/1999 | Walker et al. |
| 6,000,320 | A | 12/1999 | Herrick, IV |
| 6,000,583 | A | 12/1999 | Stern et al. |
| 6,000,817 | A | 12/1999 | Chan |
| 6,008,172 | A | 12/1999 | Broshi et al. |
| 6,100,225 | A | 8/2000 | Kalhan et al. |
| 6,100,546 | A | 8/2000 | Major et al. |
| 6,100,854 | A | 8/2000 | Dusseux et al. |
| 6,200,157 | B1 | 3/2001 | Ams et al. |
| 6,222,920 | B1 | 4/2001 | Walker et al. |
| 6,246,872 | B1 | 6/2001 | Lee et al. |
| 6,400,773 | B1 | 6/2002 | Krongold et al. |
| 6,553,221 | B2 | 4/2003 | Nakamura et al. |
| 6,631,270 | B1 * | 10/2003 | Dolan ........................... 455/453 |
| 6,800,450 | B2 | 10/2004 | Rosen et al. |
| 6,804,509 | B1 * | 10/2004 | Okon et al. ................. 455/414.1 |
| 7,068,775 | B1 | 6/2006 | Lee |
| 2002/0021793 | A1 | 2/2002 | Shmuel et al. |
| 2003/0046408 | A1 | 3/2003 | Weaver et al. |
| 2003/0195753 | A1 | 10/2003 | Homuth |
| 2003/0202507 | A1 | 10/2003 | Nishida et al. |
| 2005/0175167 | A1 | 8/2005 | Yacoub et al. |
| 2006/0256956 | A1 | 11/2006 | Lee et al. |
| 2009/0143050 | A1 | 6/2009 | Ignatin |

FOREIGN PATENT DOCUMENTS

| | | |
|---|---|---|
| JP | 59123357 | 7/1984 |
| JP | 03235563 | 10/1991 |
| JP | 09162994 | 6/1997 |
| JP | 10322773 | 12/1998 |
| JP | 11027395 | 1/1999 |
| JP | 11098562 | 4/1999 |
| WO | WO-9905876 | 2/1999 |

OTHER PUBLICATIONS

Repeat Dialing—wysiwyg://9/http://www.bellatlanti...home/NY/Products/RDX-01, 2 pages.

Comverse "Visual Voice Mail for Blackberry" Oct. 30, 2006 3 pages http://www.comverse.com/voicemail_and_videomail.aspx?domainId=29&productid=61.

* cited by examiner

METHOD AND SYSTEM FOR USER PRIORITIZATION WITHIN CALL COMPLETION SERVICES USING A PREFERRED ALLOCATION OF RESOURCES

This application is a continuation of U.S. patent application Ser. No. 11/563,389, filed Nov. 27, 2006 now U.S. Pat. No. 7,957,521, which claims benefit under 35 U.S.C. §119(e) to U.S. Provisional Application No. 60/740,552, filed Nov. 30, 2005, entitled "Method And System For User Prioritization Within Telecommunication Services And In Particular Within Call Completion Services," which are incorporated by reference herein in their entirety.

FIELD OF THE INVENTION

This invention relates generally to the field of telecommunications services and, more particularly, to prioritizing callers using a call completion service.

BACKGROUND OF THE INVENTION

A significant percentage of calls or communication attempts within a network fail for various reasons. One such frequent failure occurs during telephone calls on a landline or cellular phone network. As the delineation between phone networks and computer networks is increasingly blurred, however, similar types of incomplete communication failures occur on Voice over Internet Protocol (VoIP) systems, text and instant messaging systems, and hybrid systems that communicate over multiple systems. A communication attempt failure can occur for various reasons including when a call destination is busy, unavailable, or simply not answering.

Several solutions have been provided to facilitate completion of a failed communication attempt. These services are referred to as call completion services. Referring to FIG. 1, call completion services 100 can be broadly categorized into two major categories referred to as Caller in Charge of Call Completion Services (C4S) 101 and Destination in Charge of Call Completion Services (DC3S) 102.

One of the most popular of the DC3S 102 services is the voicemail service 110. Services such as voicemail can fulfill several purposes including call completion purposes. For example, voicemail may be used for the purpose of call completion when a caller leaves a message asking the destination to call the caller back. Voicemail can also be used for the purpose of simply conveying information to the destination.

Short Message Service (SMS) 111 is another service in the DC3S 102 category. Like voicemail service 110, SMS 111 can be used for the purpose of call completion when a caller sends a text message requesting the destination to call the caller back.

Yet another service in the DC3S 102 category is the "missed calls" service 112, which is integrated in the majority of handsets, and allows the destination to view a list of all callers that called while the destination was busy or available but not answering. A similar network service often referred to as the "who-called" or the "missed calls alert" service 113 allows the destination to receive a list of all callers that called while the destination was unavailable.

For services in the C4S 101 category, the caller maintains the responsibility of completing the call, rather than handing the responsibility to the destination. The main advantage of utilizing a service in the C4S 101 category is that the chance of a call actually being completed is much higher than with services in the DC3S 102 category since the caller in most instances is more committed to completing the call. The caller has a higher chance of completing the call with a service in the C4S 101 category since the destination may ignore a caller's initial efforts, be reluctant to accept expenses to complete the call, or otherwise communicate with the caller through a different information channel, such as through e-mail.

Services of the C4S 101 category can be further divided into two categories referred to as the C4S Call Back Services (CBS) 120 and the C4S Notify Back Services (NBS) 121.

Services in the NBS 121 category notify a caller at the first instance the desired destination is available or reachable. The caller may be notified via SMS, instant messaging, or via other services, but not via an actual call. One big disadvantage of services in the NBS 121 category is that notifications are non-synchronized. For example, at the time the notification is attempted, the caller may be unreachable. Hence, by the time the caller receives a notification of the availability or reachability of the destination, the notification may already be out of date.

Services in the CBS 120 category actually call back the caller to prompt the caller to complete the call. Services in the CBS 120 category include the Call Back for an initially-UNReachable destination service (CBUNR) 130 and the Call Back for an initially-Non-AnSWering service (CBNASW) 131. These types of services in the CBS 120 category have been disclosed in U.S. Pat. No. 6,081,725 to Ishida, U.S. Pat. No. 6,804,509 to Okon et al., and U.S. patent application Ser. No. 09/930,383 by Okon et al. and are all incorporated herein by reference in their entireties.

Some or all of the aforementioned services may be subject to situations where multiple callers apply to the same or different call completion services for the same destination. In the prevailing state of the art, when several users request a call completion service for the same initially unreachable or non-answering destination, an ordinary queue is utilized and therefore, callers are handled by the service in the order in which the callers applied for the call completion service. Hence, the current system is inflexible and may not provide call completion services in the order that is most desirable.

What is needed is a way to manage and handle a plurality of callers registered to the same or different call completion service for the same destination to execute call completion attempts in an order that is more desirable to callers and destinations.

SUMMARY OF THE INVENTION

In accordance with one aspect of the present invention, a method is provided for prioritizing callers for executing call completion services to a destination. Callers applying for call completion services are first identified. For each caller, a priority is determined and each caller is registered with his or her determined priority. Thereafter, call completion services are launched for registered callers in a hierarchical fashion in accordance with their priorities so that call completion services are preferentially launched for callers having a higher priority over callers with regular or lower priority.

In accordance with further aspects of the present invention, callers are registered for call completion services by selectively storing information about each caller in one of several queues, each corresponding to a different priority. In accordance with yet another aspect of the present invention, call completion services are launched for registered callers starting with registered callers in the queue corresponding with the highest priority in a first-in, first out basis.

In yet another aspect of the present invention, priorities of callers are automatically determined based on the preferences of the caller or the destination or on the basis of an external criterion such as the caller's position in an organization structure. In still another aspect of the present invention, a caller may chose to pay a fee to be assigned a higher priority.

In yet a further aspect of the present invention, a system is provided for prioritizing callers for executing call completion services to a destination. The system includes a data store and a plurality of modules, at least one of which has access to the data store. Callers applying for a call completion service are identified by a first module, and for each caller, a priority is determined by a second module. Information associating each caller with his or her determined priority is stored with the data store by a third module to register the caller for a call completion service. Thereafter, call completion services are launched by a fourth module for registered callers in a hierarchical fashion in accordance with their priorities so that call completion services are preferentially launched for callers having a higher priority over callers having regular or lower priority.

These and other aspects, features and advantages will be apparent from the following description of certain embodiments and the accompanying drawing figures.

BRIEF DESCRIPTION OF THE DRAWINGS

The foregoing and other features of the present invention will be more readily apparent from the following detailed description and drawings of the illustrative embodiments of the invention wherein like reference numbers refer to similar elements throughout the drawings.

DETAILED DESCRIPTION

By way of overview and introduction, the present invention comprises a method and system for registering callers and handling call completion services based on priorities assigned to the callers. When a caller applies for a call completion service, the caller is assigned a priority from among different priorities such as, for example, high priority or regular priority. Thereafter, attempts to execute the call completion service are performed hierarchically by launching call completion services for callers having a higher priority before similar attempts are performed for callers of a lower priority. Hence, call completion services are handled according to the priority assigned to the caller rather than the order in which callers applied for the service. By utilizing different criteria for assigning priorities to callers, the present invention provides extensive flexibility in the manner in which call completion services are handled.

Figure 2:
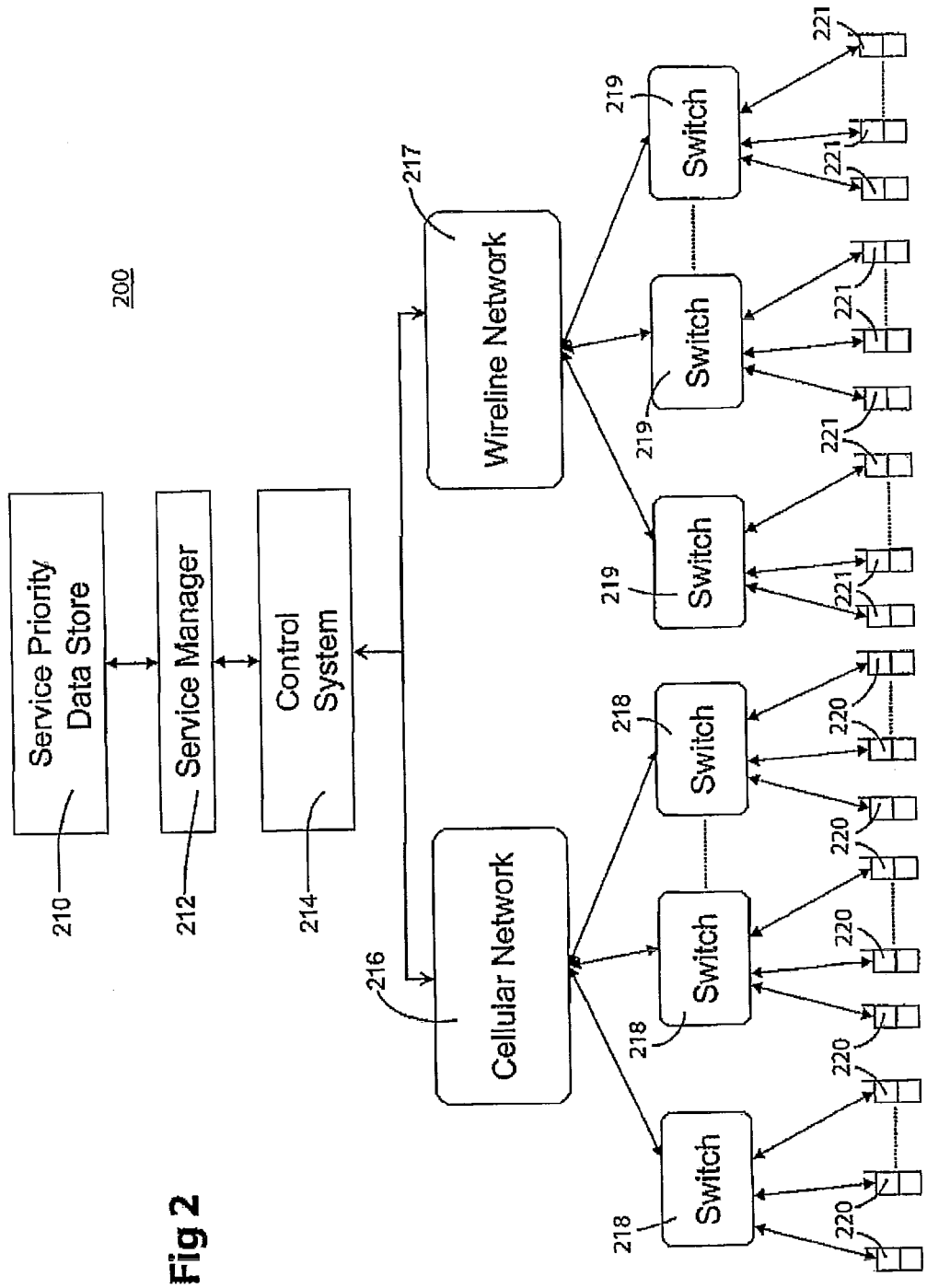
FIG. 2 illustrates a high-level diagram of a communication system implementing an embodiment of the present invention.

FIG. 2 depicts a high-level diagram of a communication system 200 implementing an embodiment of the present invention. Communication system 200 includes cellular network 216 and wireline network 217 that are connected to control system 214, which manages communication system 200. Cellular network 216 includes one or more switches 218 for connecting to one or more cellular phones 220. Wireline network 217 includes one or more switches 219 for connecting to one or more wireline phones 221.

Communication system 200 further includes service manager 212 and service priority data store 210 that interface with control system 214. Service manager 212 performs various functions in accordance with the present invention including, for example, assigning of priorities to callers applying for call completion services and handling attempts to execute call completions. Service priority data store 210 stores various data that are utilized by service manager 212 in accordance with the present invention including, for example, information regarding the assigned priorities of callers and preferences of the caller or destination for assigning such priorities. Data store 210 can be any device that can store information and is capable of being accessed by a computer or a processor therein such as, for example, Random Access Memory (RAM), hard drive, flash memory, or a database.

Service manager 212 or service priority data store 210 can be added or integrated into control system 214. As would be appreciated by those of ordinary skill in the art, many different types of services including, for example, voicemail services, messaging services, and various call completion services can be added or integrated with control system 214. As would be further appreciated by those of ordinary skill in the art, similar techniques used to include such services to control system 214 can be utilized to integrate service manager 212 and service priority database 210 into control system 214 or to add their functionality to control system 214.

Control system 214 can be embodied on a computer, which includes a processor capable of executing a variety of software modules. Although a centralized control system 214 is illustrated, control system 214 can be implemented in a distributed manner across multiple computers and components of communication system 200. Furthermore, control system 214 can manage multiple cellular and wireline networks that connect to various communication devices such as, for example, Personal Digital Assistants (PDAs), personal computers, and VoIP devices.

It should be noted that for convenience and brevity, any communication attempt, such as, for example, a phone call, an internet voice communication, a VoIP communication, an instant message, or a communication bridging multiple services shall be referred to as a "call." Additionally, any person or machine performing such attempt shall be referred to as a "caller", and any person or machine who is the intended target or intended recipient of such attempt shall be referred to as a "destination". As the varying communication networks mature, the delineation between the communication services is blurred. Furthermore, non-telephonic communication systems have begun offering similar sets of services including analogous forms of away messages, voicemail, and ringback. The caller and destination need not be using the same communication service. For example, a VoIP phone can easily communicate with a cellular phone 220 or wireline phone 221 through the cellular network 216 and wireline network 217. Similarly, instant messages can be sent and received, for example, on cellular phones 220 as well as on personal computers (not shown) connected, for example, to wireline network 217.

It should further be noted that caller and destination are not limited to people. Rather, the caller and destination can be a person, a computer, another machine, or a combination thereof. For example, machines and computers are frequently used to place and receive automated calls for marketing or customer service. In the case of a customer service answering system, the destination is typically a computer, which provides a series of prompts to identify the correct person to forward the call. Similarly, telemarketing calls are frequently placed by a machine to multiple phones simultaneously. As the telemarketing calls are answered, the computer placing the calls forwards the call to a live person to speak with the destination. Thus, a user can establish VoIP calls using a personal computer and likewise, a personal computer can automatically place or receive calls.

It should also be noted that the manner in which a caller receives preferred treatment according to the present invention can vary according to the type of call completion service requested. In some embodiments, where a scarcity of system resources exists, such as memory space, computing power, bandwidth, sampling resources and the like, prioritization is provided by giving a caller with higher priority a preferred allocation of resources. In some embodiments, prioritization can be implemented by promoting the caller in a queue. In other embodiments, both types of preferred treatment can be applied.

For services in the DC3S category such as voicemail, SMS, instant messaging, and "missed calls," prioritization can be applied by promoting the caller in the order in which such messages are launched to the destination or downloaded by the destination. For services in the C4S category such as the call completion procedure taught by U.S. Pat. No. 6,804,509 to Okon et al., which is incorporated herein by reference in its entirety, the prioritization can include enhanced iteration process parameters in determining reachability, preferred allocation of voice channels (e.g., trunks) for execution of the call completion service, as well as moving the prioritized caller up in a sequence list in which call completions are executed to a destination.

Furthermore, as taught in the above referenced U.S. Pat. No. 6,804,509, availability is not only a matter of being in a covered area and receiving a strong enough signal, but also having sufficient network resources for executing a call completion. This becomes especially important in Third Generation GSM (3G) systems where resources might become scarce due to high demand for spectrum resources and due to VoIP applications which require real-time throughput. In such systems, a caller can be given priority in accordance with the present invention by promoting the caller in a queue or by providing the caller with a preferred allocation of resources.

Figure 1:
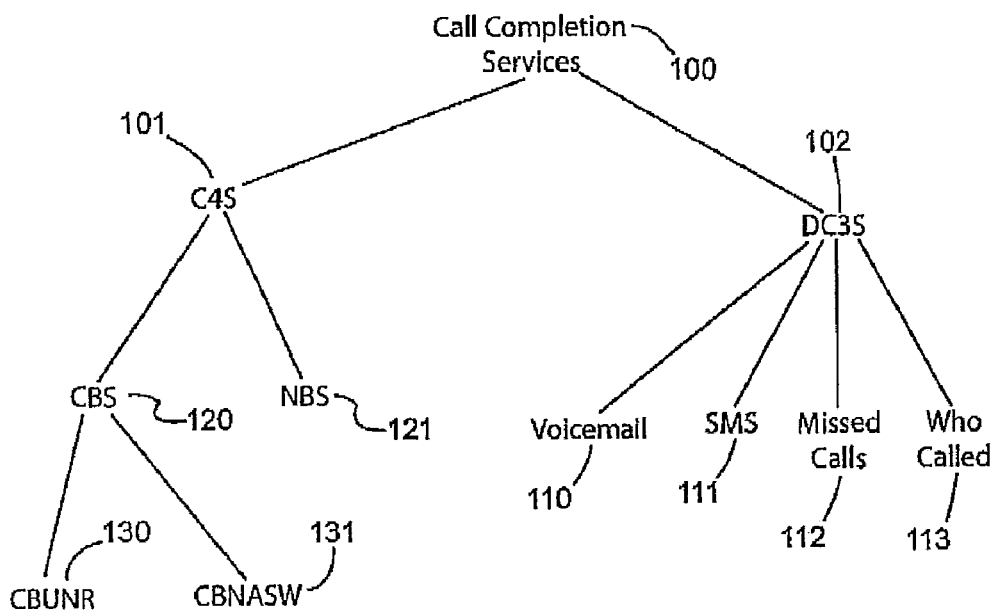
FIG. 1 illustrates various known types of call completion services.
Figure 3:
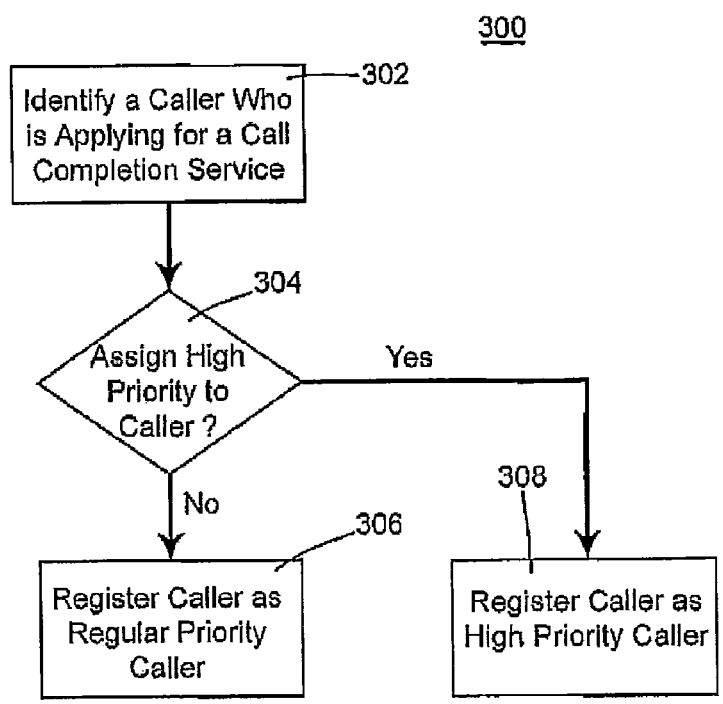
FIG. 3 depicts a flow chart illustrating a process for registering callers applying for call completion services, according to an embodiment of the present invention.

FIG. 3 depicts a flow chart illustrating the steps of a process 300 for registering callers applying for call completion services in accordance with an embodiment of the present invention. Process 300 can be executed by control system 214 integrated with the functionality of service manager 212.

In step 302, a caller is identified as applying for a call completion service. For example, a caller is identified as applying for a call completion service when a control system of a network detects that a call cannot be completed to a destination. In another example, a caller is identified by a control system as applying for a call completion service when the caller attempts to send an SMS message or an instant message. One system that provides call completion services in a communication network accessible to wireless devices is described in U.S. Pat. No. 6,631,270 to Dolan, which is incorporated herein by reference in its entirety. In the system described by Dolan, a caller using a wireless device can be identified as requiring a call completion service when congestion is detected in the cell sites necessary to complete the call. Such an approach can be utilized in accordance with the present invention to identify callers applying for call completion services.

In step 304, a determination is made as to whether the caller should be registered as a high priority caller or a regular priority caller. Such a determination can be made automatically. In one example, a control system compares the caller with a set of predefined callers stored in a data store, such as data store 210, for the destination. If the caller matches one of the predefined callers, the caller is assigned a stored priority level specified for the predefined caller in the data store. In another example, the control system compares the caller with one or more predefined criteria stored in the data store and if the caller qualifies for a criterion, the caller is assigned the priority level stored for the criterion. Additionally, a caller can also indicate to the control system that the caller wishes to be treated as either a high priority caller or a regular priority caller. Various approaches for assigning priorities, techniques for specifying predefined callers and criteria, and the nature of information expressing predefined callers and criteria are described later below in greater detail.

Once a determination is made, the caller is registered accordingly as either a regular caller in step 306 or a high priority caller in step 308. Steps 306 and 308 can involve storing information in a data store such as, for example, data store 210, to register the caller as having either high or regular priority. The stored information can include any data necessary to execute the call completion service applied for by the caller. Furthermore, the stored information can include the priority for the caller and the order in which the caller applied for a call completion service.

Figure 4:
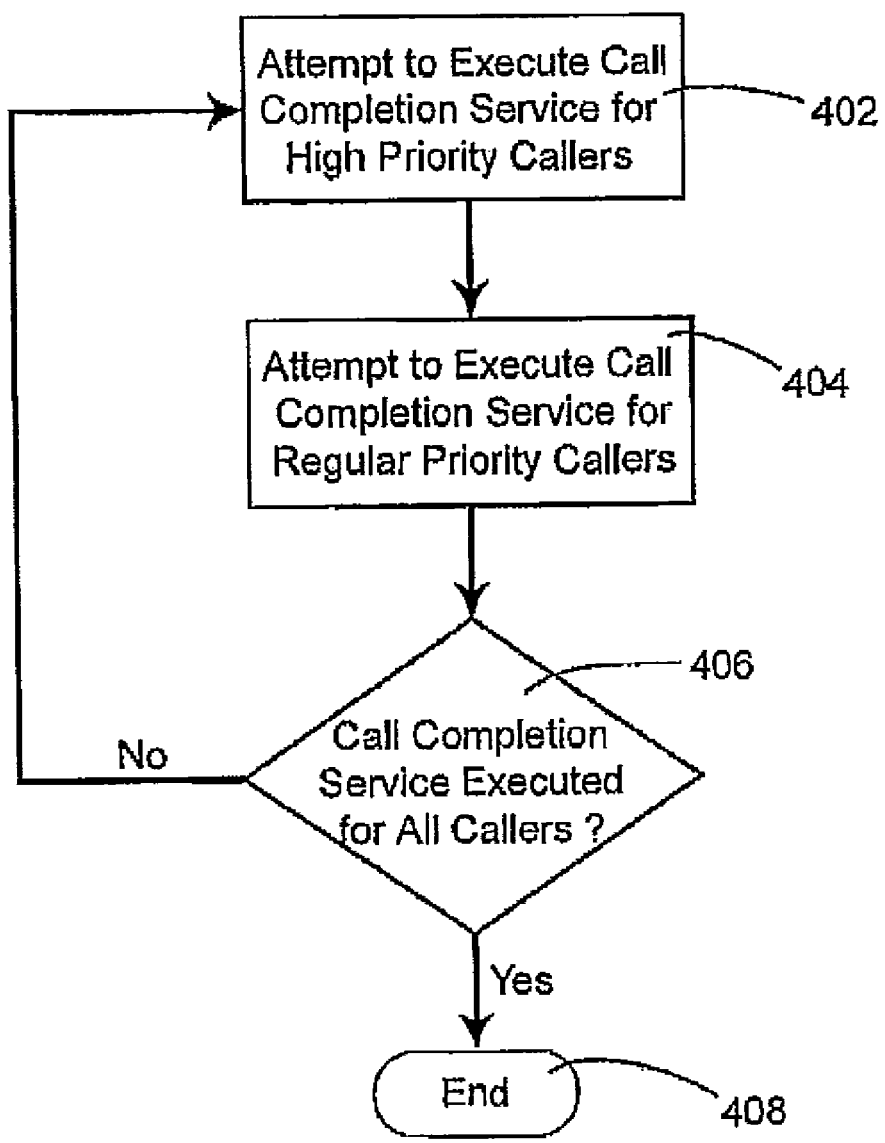
FIG. 4 depicts a flow chart illustrating a process for launching call completion services based on priorities of registered callers, according to an embodiment of the present invention.

FIG. 4 depicts a flow chart illustrating the steps of process 400 for launching call completion services based on priorities of registered callers in accordance with an embodiment of the present invention. Process 400 can be executed by control system 214 integrated with the functionality of service manager 212.

In step 402, attempts are made to execute call completion services for each registered caller having high priority. When there are multiple registered callers with high priority, call completion attempts are launched, for example, in the order in which each caller applied for a call completion service.

After attempts are made to execute call completion services for registered callers with high priority, attempts are made in step 404 to execute call completion services for registered callers having regular priority. When there are multiple callers with regular priority, attempts are made, for example, in the order in which each caller applied for a call completion service.

In step 406, a check is performed to determine if a call completion service was executed for all registered callers. A call completion service may not have executed because, for example, the caller who registered for the call completion service was unavailable or unreachable. If there are any registered callers remaining who still require a call completion service to be executed, process 400 returns to step 402. Otherwise, process 400 ends at step 408.

Although FIGS. 3 and 4 depict processes for an embodiment of the present invention wherein only two types of priorities, high priority and regular priority, are utilized, one skilled in the art can apply the general principles depicted in FIGS. 3 and 4 for embodiments of the present invention having three or more different priorities. For example, in a further embodiment, callers can be assigned one of priority A, priority B, or priority C. Such an embodiment of the present invention can attempt to execute call completion services for callers having priority A before attempting to execute call completion services for callers having priority B or C. Once attempts to execute call completion services for callers having priority A have been performed, similar attempts are performed for callers having priority B and then for callers having priority C. If by the end of the process, any registered callers still require call completion services to be executed, the process can be restarted until call completion services have been executed for all registered callers. Hence, the present invention can service call completions for numerous callers in a hierarchical fashion according to the priorities of the callers.

Priorities can be assigned to callers applying for call completion services based on the preferences of the caller, preferences of the destination, or based on predefined criteria such as, for example, a caller's position in an organization's structure. Such preferences and criteria can be specified by the caller, the destination, or third parties utilizing an interface to a control system such as control system 214 integrated with the functionality of service manager 212. The user interface can involve keying on a handset a code for requesting such preferences and criteria. Additionally, the user interface can be a web-based interface that can be accessed via a computer, a web-enabled telephone, or other web-enabled devices. Specifying preferences and criteria can be performed prior to a caller applying for a call completion service, at the time a caller is applying for call completion service, or thereafter. Furthermore, the control system can provide an automated, menu-based interface where preferences and criteria can be specified by users with the keys of a telephone or through voice recognized commands. Alternatively, a graphical user interface can be built into the handsets of phones to allow users to specify preferences and criteria to the control system. As will be appreciated by those skilled in the art, various other interfaces can be employed to allow users to specify preferences and criteria to a control system, such as control system 214 with the functionality of service manager 212.

User specified preferences and criteria are stored in a data store, such as data store 210, and accessed by a control system in accordance with the present invention such as control system 214 integrated with the functionality of service manager 212. User specified preferences can include stored information identifying a caller and the priority that is to be assigned to the caller. User specified criteria can include a stored set of rules that can be executed by a control system to determine if the caller qualifies for the criteria. For example, a user can specify a criterion that gives an immediate supervisor of a destination a higher priority over all other callers. Such a criterion can include a database of supervisor and subordinate relationships and a rule that can be executed by a control system. When the rule is executed, the relationship database is inspected to determine if a caller is an immediate supervisor associated with the destination. If the caller is an immediate supervisor, the caller is assigned the stored priority specified for the criterion in the data store. As will be appreciated by those skilled in the arts, various types of information can be stored in a data store, such as data store 210, to express various preferences and criteria for assigning priorities to callers.

A variety of approaches can be used to assign priorities to callers. These approaches can be categorized as destination-based priorities, caller-based priorities, and third-party-based priorities. Each of these categories is described in greater detail below.

Destination-based priorities are approaches for assigning priorities to callers based on the preferences of the destination. A destination may wish to be more accessible to some callers than others. For example, when a caller downloads voicemail to a handset, the caller may wish to first hear messages in an order that is different from the order in which the messages were recorded. For example, the caller may wish to hear messages from the caller's family members first and then listen to messages from other callers. The Visual Mailbox service introduced by Comverse, Inc. attempts to address this situation by initially downloading all the messages to the destination's handset and then allowing the destination to manage the manner and order in which the messages are played. The Visual Mailbox approach, however, requires the destination's recurring attention and intervention and does not enable an automatic prioritization mechanism.

Unlike the Visual Mailbox approach, an embodiment of the present invention allows a destination to predefine one or more callers with varying priorities so that attempts to execute call completion services can be performed automatically according to their priorities. For example, a destination can specify family members as predefined callers with high priority and all other callers as having regular priority. When family members and other callers apply for call completion services, attempts to execute call completion services for family members are automatically made prior to attempts to execute call completion services for all other callers in accordance with an embodiment of the present invention.

In another example, a destination can specify predefined priorities for callers so that the destination, once becoming reachable, can be connected to callers requesting callback in an order different from the order in which the callers applied for the callback service. U.S. Pat. No. 6,804,509 to Okon et al., which is incorporated herein by reference in its entirety, describes a system and method for completing calls to an initially unavailable destination in the order in which the callers applied for the callback service. An embodiment of the present invention in conjunction with, for example, such a system and method described in U.S. Pat. No. 6,803,509 to Okon et al. allows for a destination, upon becoming reachable, to connect to callers requesting callback in some fixed or temporarily defined order that is different from the order in which the callers applied for the callback service.

In another embodiment of the present invention, a destination can have incoming SMS messages or instant messages sorted in a manner according to predefined priorities. SMS and instant messaging allow a caller to send a message to a destination. SMS and instant messaging differ in that instant messaging is a synchronized communication application. If, for example, instant messaging proliferates to a level where a destination gets numerous messages throughout the day and must have the messages screened, prioritization of messages in accordance with the present invention can be utilized to differentiate urgent and regular messages.

In yet another embodiment of the present invention, a destination can predefine an exclusive list of callers as having a priority that would enable them to interrupt the destination in an active conversation, for example, in a manner such as call waiting. Callers that are not on the exclusive list would find the destination unreachable and can be given access to call completion services.

In yet another embodiment, a destination can grant higher priority to callers having a special referral code or access code. A caller wishing to apply for a call completion service can be prompted for a code or otherwise be given the possibility of entering such a code as part of the service request procedure. When a correct code is entered, the caller is given a higher priority. Such an embodiment can be used to altogether screen out, for example, calls, instant messages, or SMS messages from known and unknown callers to thereby, for example, minimize spam messages.

Caller-based priorities are approaches for assigning priorities to callers based on the preferences of the caller. For example, a caller applying to a call completion service may wish to have his or her call completion service executed ahead of other callers applying for a call completion service to the same destination. In an embodiment of the present invention, a caller can be given an option of gaining higher priority by paying a per-use or one-time fee. In another embodiment, a caller can be given an option of paying a subscription fee to be treated as a high priority caller on an on-going or permanent basis.

By allowing callers to select priority preferences, a caller can choose to gain quicker access or connection to a destination through a call completion service in accordance with an embodiment of the present invention. For example, by selecting high priority, a caller's voicemail can be heard by the destination before other voicemails left by callers with regular priority are heard. In another example, a caller's SMS message or instant message can be positioned to appear before all other unread messages sent by callers having regular priority. Likewise, a caller can, for example, select high priority to be connected through a callback service before other callers with regular priority are connected.

In an embodiment, a caller is informed of his or her position in the order in which call completion services will be executed and is given the option of having his or her call completion service executed sooner for a fee. For example, after leaving a voicemail message, a caller can be informed of his or her place in a queue of pending voicemails and prompted with an option of gaining higher priority for a fee. If the caller selects a higher priority, the caller's voicemail message can be placed at the head of the queue or ahead of all other voicemails left by callers having regular priority. The longer the queue and the more urgent the message, the greater the incentive is for a caller to accept the offer.

Furthermore, an embodiment of the present invention can be utilized in conjunction with advanced voicemail systems that provide a destination with a one-touch feature to return a call immediately from within the voicemail service upon hearing a message. In such an embodiment, when a caller suspects that the destination will return calls to users who left earlier messages before having a chance to hear the caller's urgent message, the caller can choose to have his or her voicemail heard ahead of others by selecting a higher priority.

In another embodiment, a caller can select to become a high priority caller to interrupt a destination in active conversation. For example, a caller can choose to pay a fee to obtain high priority to enter a call waiting service for a destination in active conversation even when the destination has not placed the caller on a predefine list of callers who are preferably allowed to interrupt the destination's active conversations. Likewise, in another embodiment, a caller can pay to receive high priority for a "who-called" or "missed calls alert" service so that the caller will appear ahead of other callers having regular priority when the destination receives a list of callers that called while the destination was unavailable.

Priorities of callers can also be assigned based on third-party criteria. For example, in an embodiment, emergency services, such as 911 services, can always be granted the highest priority. In another embodiment, priorities of callers can be based on predefined properties such as, for example, a caller's position in an organization structure. For example, the head of the organization can always be the first caller to gain access to a destination in the organization. Furthermore, an immediate superior of the destination can be granted a priority that provides greater access to the destination than the destination's subordinates.

In yet another embodiment, a single organization can apply separate criteria for assigning priorities based on particular situations or needs. For example, an organization can apply one criterion for emergency situations and another criterion for normal operations. A clear and coherent system of assigning organizational priorities can be of special importance in times of emergency when time is of the essence and everyone is trying to reach everyone else. In accordance with an embodiment of the present invention, by specifying appropriate priorities for callers, an organization can cause information to flow from callers to destinations in a manner that is more effective for the organization during times of emergency.

In another embodiment, a caller can be granted high priority as a part of a promotional benefit. For example, a user can be granted high priority as a fringe benefit, as a part of a bundle of services that the caller has purchased, or as a bonus for being a preferred customer. In yet another embodiment, a caller can automatically qualify as a preferred customer and granted high priority when, for example, the caller's phone bill is more than twice the average bill. Such an embodiment can reward preferred customers in accordance with the present invention to keep such customers satisfied and to increase their willingness to pay for continued and additional services. In yet another embodiment, a caller can be provided with a fringe benefit that provides the caller with high priority for a designated number of call completions. Accordingly, the designated number of call completions that are remaining for the fringe benefit is reduced each time the caller is given high priority as a result of the fringe benefit.

Figure 5:
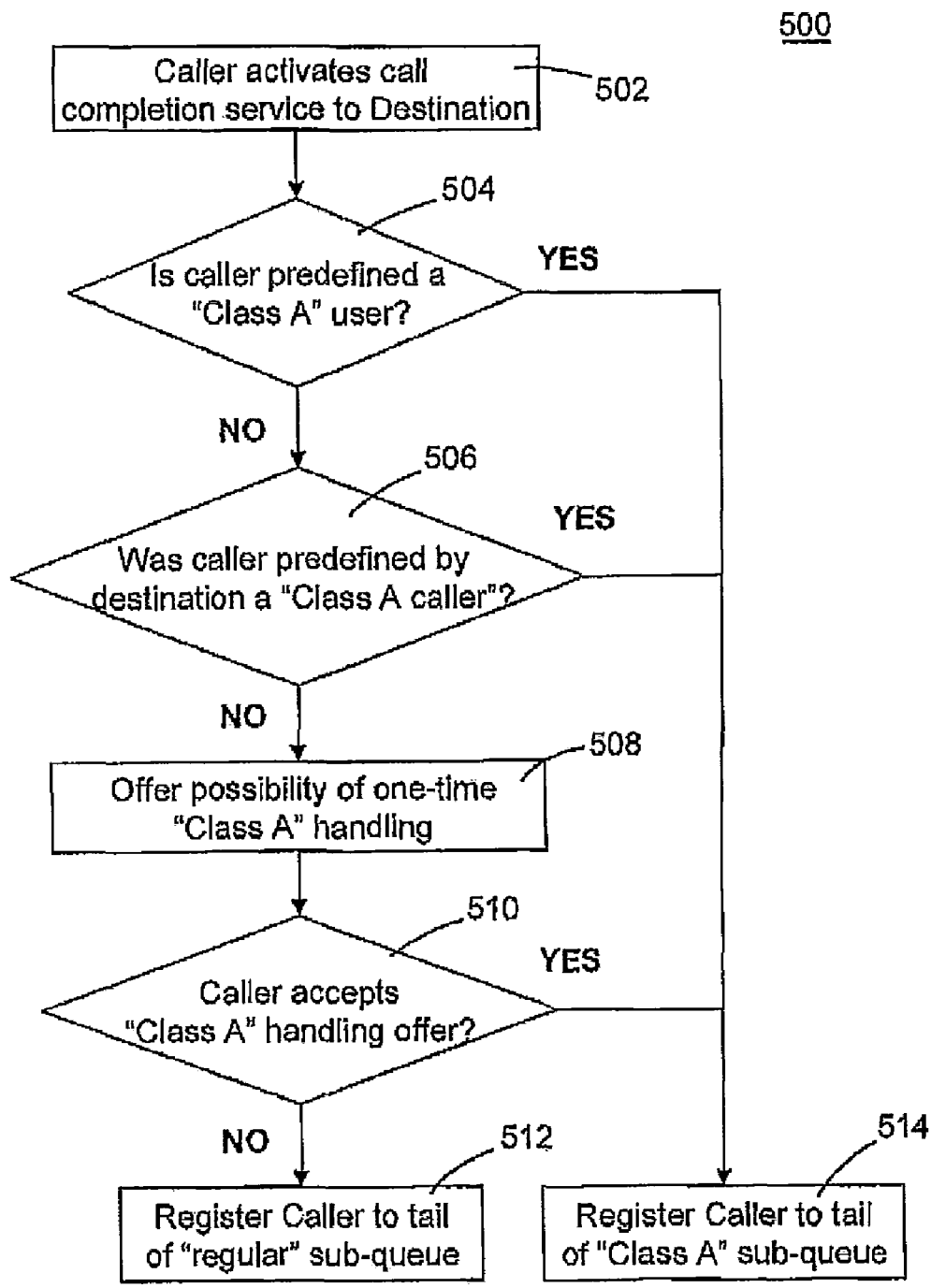
FIG. 5 depicts a flow chart illustrating a process for registering callers for call completion services utilizing queues corresponding to different priorities, according to an embodiment of the present invention.
Figure 6:
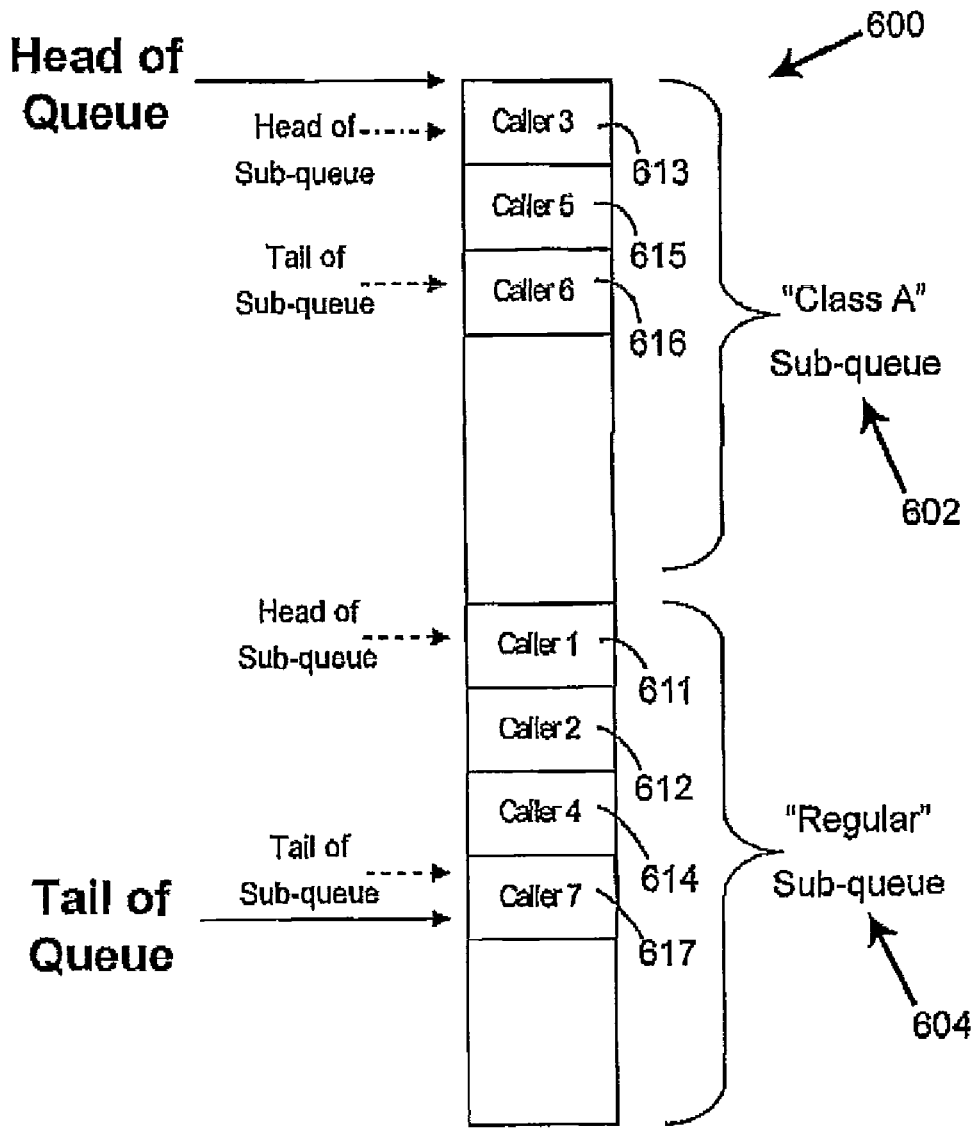
FIG. 6 illustrates a queue for a call completion service that enables registration and hierarchical servicing of callers in accordance with an embodiment of the present invention.

FIGS. 5 and 6 depict an embodiment of the present invention utilizing priority queues to service call completions hierarchically in accordance with the present invention. The embodiment of FIGS. 5 and 6 may be implemented as part of control system 214 integrated with the functionality of service manager 212.

FIG. 5 depicts a flow chart illustrating a process 500 for registering callers for call completions to the same destination utilizing queues corresponding to different priorities, according to an embodiment of the present invention. In step 502, a caller is identified as applying for a call completion service. For example, when a caller cannot complete a call to a destination, the caller can activate a call completion service to the destination and be identified by process 500.

In step 504, a comparison is made with a database, such as for example data store 210, to determine if the caller is a predefined caller with "Class A" priority. A caller can be predefined as having Class A priority, for example, if the caller is a recipient of a promotional benefit, a subscriber of Class A priority, or a member of a group in an organization having Class A priority. If the caller is identified as having Class A priority, the caller is added to the tail of a queue corresponding to Class A priority in step 514. Otherwise, process 500 continues to step 506.

In step 506, the caller is compared with a database, such as, for example, data store 210, to determine if the destination has specified that the caller is to be treated with Class A priority. For example, the destination can designate with a system in accordance with the present invention executing the process 500, such as control system 214, to have the caller treated as a Class A priority caller. In another example, the destination can provide the caller with a referral or access code that can be input when the caller is activating the call completion service to indicate that the destination wishes to have the caller treated as a Class A priority caller. If the caller is identified as having Class A priority, the caller is added to the tail of the Class A queue in step 514. Otherwise, process 500 proceeds to step 508.

In step 508, the caller is prompted with an offer to be serviced with Class A priority on a one-time basis for an additional fee. In step 510, a check is made to determine if the caller chose to accept the offer in step 508. If the caller accepts the offer, the caller is added to the tail of the Class A queue in step 514. Otherwise, the caller is added to the tail of a queue corresponding to regular priority in step 512.

FIG. 6 illustrates a queue 600 for a call completion service that enables registration and hierarchical servicing of callers, according to an embodiment of the present invention. Queue 600 is divided into two sub-queues 602 and 604 corresponding to Class A priority and regular priority, respectively. Callers identified as having Class A priority are registered to the tail of Class A sub-queue 602 on a first come, first served basis. Other callers are registered to the tail of regular sub-queue 604 on a first come, first served basis. In an embodiment, process 500 can be utilized to register callers with queue 600.

Call completion services are launched according to the order in which callers are positioned in queue 600. First, call completion services are launched for callers in the Class A sub-queue 602, first from the head of the sub-queue 602 and toward its tail. Next, call completion services are launched for callers in the regular sub-queue 604, first from the head of the sub-queue 604 and toward its tail. In an embodiment, call completion services are launched for callers in the regular sub-queue 604 only when Class A sub-queue 602 is empty.

When a call completion service is executed successfully for a caller, the caller is removed from queue 600. When a call completion attempt fails because the destination is unavailable or unreachable or non-answering, the call completion is attempted periodically until the destination is responding. If a call completion service involves a callback to the caller and the caller is unavailable, unreachable, or non-answering, the caller is skipped until the caller responds. In an embodiment, when a caller is unavailable, unreachable, or non-answering for a callback, the caller can be downgraded by moving the caller toward the tail of queue 600. In another embodiment, downgrading is only applied to callers with regular priority.

In another embodiment, after call completion services are executed for several Class A priority callers, one regular priority caller can be moved from regular sub-queue 604 to Class A sub-queue 602. This approach can ensure that call completion services are executed for all callers within a reasonable amount time even when more and more callers with Class A priority keep arriving.

FIG. 6 further depicts an exemplary result of queue 600 after callers 611-617 have registered for call completion services. Caller 611 represents a regular priority caller that was first to register when queue 600 was empty. Accordingly, caller 611 appears at the head of regular sub-queue 604. Caller 612 represents the second caller to register. Since caller 612 also has regular priority, caller 612 was added to regular sub-queue 604 and appears behind caller 611. Caller 613 represents a Class A priority caller that was third to register with queue 600. As the first caller to register with Class A priority, caller 613 appears at the head of Class A sub-queue 602. Caller 614 represents the fourth caller to register. As caller 614 is a regular priority caller, caller 614 was added to regular sub-queue 604 after caller 612. Callers 615 and 616 represent the fifth and sixth callers to register, respectively. Both callers 615 and 616 are Class A priority callers and accordingly are positioned behind caller 613 in Class A sub-queue 602. Finally, regular priority caller 617 represents the seventh caller to register and appears at the tail of regular sub-queue 604.

In accordance with an embodiment of the present invention, once the destination is available, call completion services are launched for callers 611-617 in the order in which each caller is positioned in queue 600 from the head of the queue toward the tail, starting with callers in the Class A sub-queue 602. Hence, a call completion service is launched first for caller 613. Thereafter, call completion services are launched for the remaining callers in the sequence of caller 615, caller 616, caller 611, caller 612, caller 614, and finally caller 617.

As would be appreciated by those skilled in the art, Class A sub-queue 602 and regular sub-queue 604 can alternatively be implemented as two separate queues rather than as sub-queues within a master queue 600. Furthermore, as would be appreciated by those skilled in the art, additional queues can be utilized to hierarchically distinguish and service callers with more than two classes of priorities.

In some instances, changes may be required to existing call completion services to integrate support for priorities in accordance with an embodiment of the present invention. For example, portions of computer based resources such as memory, CPU, and the like may need to be reserved to support the needs of high priority callers. In one embodiment, a pool of resources in a voicemail service are reserved so that even when a destination's mailbox is completely full for callers having regular priority, callers with high priority are still able to leave a voicemail. Similarly, call completion services can further allocate special pools of resources that are reserved for only top priority callers.

In another embodiment, a call completion service can be modified to provide more rapid or responsive service for callers with higher priorities. For example, in a call completion service that periodically checks the availability or reachability of an unreachable or unavailable destination, the frequency of checks can be increased for callers with higher priorities. For example, U.S. Pat. No. 6,804,509 to Okon et al., which is incorporated herein by reference in its entirety, discloses a method and system for notifying a caller that a cellular phone destination is available. The rate at which such a system checks for the availability of the destination can be increased for callers with higher priorities.

Additionally, input systems for a call completion service may need to be updated. By default, the system will assign regular callers a regular priority for call completion services. In an embodiment, a caller can activate a call completion service when the destination is unavailable or unreachable by pressing a string of keys on the caller's phone. For example, the caller can press keys * and 7 (also corresponding to keys *q) to become registered for a call completion service as a "regular" priority caller. Additionally, the caller can press keys *, 7, and 7 (also corresponding to keys *qq) to request higher priority call completion service. Furthermore, the caller can press *, 7, 7, and 7 (also corresponding to keys *qqq) to indicate that the caller wishes to be registered as having top priority. When a caller requests higher or top priority, additional or premium fees can be charged to the caller. In an embodiment, a prioritization cancellation code is provided to the caller so that the caller can use the code to cancel the caller's request for higher priority. In one embodiment, the caller keys in the cancellation code using the caller's handset interface to indicate to the service manager that the caller wishes to cancel the request for higher priority.

Likewise, the caller can change a prioritization in other ways, such as by interacting with an option provided to enable the caller to request a different priority level for pending call completion requests. In such an embodiment, a caller can input a particular priority request code using an interface to the service manager to indicate that the caller wishes to have the service manager execute the caller's pending and future call completion requests with a different priority. For example, when a regular caller acquires a preferred status, the priority of the caller's pending and future requests for call completions are automatically upgraded. In another example, when a high priority caller requests to cease being at a high priority level (e.g. to avoid higher charges), the caller's pending and future requests for call completions will be downgraded from high priority. This embodiment can be implemented in the service manager, for example, by replacing pending call completion requests registered in the service priority data store with corresponding call completion requests at the new priority level.

In another embodiment of the present invention, special keys on phone handsets can be utilized to enable or disable call completion services for both callers and destinations or to enable or disable prioritization offerings by the system. In yet another embodiment, pressing the special keys repeatedly or holding down a special key for a short duration can request higher priority for call completion services.

As would be appreciated by those skilled in the art, various embodiments and processes described herein can be implemented as software modules executing on a computer. A software module includes anything that can be executed by a computer such as, for example, compiled code, binary machine level instructions, assembly code, source level code, scripts, function calls, library routines, and the like.

While the invention has been described in connection with a certain embodiment thereof, the invention is not limited to the described embodiments but rather is more broadly defined by the recitations in the claims below and equivalents thereof.

What is claimed:

1. A computer-implemented method for prioritizing callers for a call completion service to a destination when a call attempt to the destination fails, comprising:
   providing a control system comprising a computer having a processor and having one or more resources allocatable to the call completion service;
   executing one or more software modules in the processor and thereby configuring the processor, in which:
   a first module is identifying that a caller is applying for a call completion service;
   a second module is automatically determining if the caller should have a first priority or a second priority;
   a third module is registering in a data store information to associate the caller with the determined priority; and
   a fourth module is launching the call completion service in response to any data in the data store and in hierarchical accordance with the determined priority; and
   handling the call completion service to the destination using a preferred allocation of the one or more of the resources in support of the call completion service for the caller having the first priority and a different allocation of the one or more of the resources for the caller having the second priority.

2. The method of claim 1, wherein the third module operates to:
   selectively store the information either to a first priority queue or a second priority queue based on the determined priority.

3. The method of claim 2, wherein the fourth module operates to:
   launch the call completion service for each caller registered in the first priority queue on a first-in, first-out basis.

4. The method of claim 3, wherein the fourth module operates to:
   launch the call completion service for each caller registered in the second priority queue only after the first priority queue is empty.

5. The method of claim 1, wherein the second module operates to:
   identify the caller who is applying for the call completion service;
   compare the identified caller against a database for a match as a predefined caller; and
   establish the caller as having the first priority.

6. The method of claim 5, further comprising:
   allowing the destination of the call completion service to specify the predefined caller.

7. The method of claim 5, wherein the first module operates to identify the caller as being associated with an organizational structure, and wherein the comparing performed by the second module compares the identified caller against an organization database for a match as the predefined caller.

8. The method of claim 1, wherein the second module operates to:
   identify the caller who is applying for the call completion service;
   compare the identified caller against a database for a match as a holder of a benefit; and
   establish the caller as having the first priority.

9. The system of claim 1, wherein the allocated resources are computer based resources of the computer.

10. The method of claim 1, further comprising:
    providing the caller who is applying for the call completion service with an option of selecting the first priority before the registering step.

11. The method of claim 10, further comprising:
    charging the caller a fee in response to selecting the first priority.

12. The method of claim 11, wherein the fee is a per-use fee.

13. The method of claim 11, wherein the fee is a subscription fee.

14. The method of claim 1, further comprising a module operative to:
    automatically determine for another caller who is applying for the call completion service as having a third priority.

15. The method of claim 14, further comprising:
    launching the call completion service for any other caller registered in the data store as having the second priority prior to launching the call completion service for any additional caller registered in the data store as having the third priority.

16. The method of claim 1, further comprising:
    receiving an indication that the caller wishes to have a different priority from the determined priority after the step of registering; and
    replacing the registered information in the data store with information to associate the caller with the different priority.

17. A system for prioritizing callers for a call completion service to a destination when a call attempt to the destination fails, comprising:

a data store;
a plurality of modules, at least one of which has access to the data store, including:
a first module operative to identify that a caller is applying for a call completion service;
a second module operative to automatically determine if the caller should have a first priority or a second priority;
a third module operative to register in the data store information to associate the caller with the determined priority;
a fourth module operative to launch the call completion service in response to the information in the data store and in hierarchical accordance with the determined priority; and
a control system comprising a computer having a processor configured to execute the plurality of modules and having resources allocatable to the call completion service so as to handle the call completion service launched by the fourth module such that a preferred allocation of one or more of the resources is allocated to the caller having the first priority and a different allocation of the one or more resources is allocated to the caller having the second priority.

18. The system of claim 17, wherein the fourth module launches the call completion service for registered callers having the first priority before launching the call completion service for any registered callers having the second priority.

19. The system of claim 17, wherein the third module further comprises:
a fifth module operative to selectively store the information either to a first priority queue or a second priority queue based on the determined priority.

20. The method of claim 17, wherein the allocated resources are computer based resources of the computer.

* * * * *